(12) United States Patent
Richardson

(10) Patent No.: US 9,723,823 B2
(45) Date of Patent: Aug. 8, 2017

(54) FISHING LINE DISPENSER

(71) Applicant: Terry Richardson, Pratt, KS (US)

(72) Inventor: Terry Richardson, Pratt, KS (US)

( * ) Notice: Subject to any disclaimer, the term of this patent is extended or adjusted under 35 U.S.C. 154(b) by 0 days.

(21) Appl. No.: 15/249,778

(22) Filed: Aug. 29, 2016

(65) Prior Publication Data
US 2016/0360738 A1 Dec. 15, 2016

(51) Int. Cl.
| | | |
|---|---|---|
| *A01K 89/00* | (2006.01) | |
| *B65H 49/32* | (2006.01) | |
| *B65H 75/32* | (2006.01) | |
| *B65H 49/20* | (2006.01) | |
| *B65H 59/04* | (2006.01) | |

(52) U.S. Cl.
CPC ......... *A01K 89/003* (2013.01); *B65H 49/205* (2013.01); *B65H 49/321* (2013.01); *B65H 49/325* (2013.01); *B65H 59/04* (2013.01); *B65H 75/32* (2013.01); *B65H 2701/355* (2013.01)

(58) Field of Classification Search
CPC .... A01K 89/003; B65H 49/205; B65H 49/32; B65H 49/321; B65H 49/324; B65H 49/325; B65H 59/04; B65H 75/32; B65H 2701/355

See application file for complete search history.

(56) References Cited

U.S. PATENT DOCUMENTS

| | | |
|---|---|---|
| 3,295,787 A | 1/1967 | Golonka |
| 3,399,847 A | 9/1968 | Slate |
| 3,685,761 A | 8/1972 | Zelinski |
| 4,012,010 A | 3/1977 | Friedman |
| 4,026,063 A | 5/1977 | Allen et al. |
| 4,323,206 A | 4/1982 | Dickey |
| 4,540,136 A | 9/1985 | Rauch |
| 4,717,086 A | 1/1988 | Crow |
| 4,776,527 A | 10/1988 | Prowant |

(Continued)

FOREIGN PATENT DOCUMENTS

| | | |
|---|---|---|
| GB | 2101461 | 1/1983 |
| GB | 2212041 | 7/1989 |

(Continued)

*Primary Examiner* — William E Dondero
(74) *Attorney, Agent, or Firm* — Kenneth H. Jack; Davis & Jack, L.L.C.

(57) ABSTRACT

A fishing line dispenser, the fishing line being wound about a spool having circular walls, and a bore, the dispenser including a base; a " C " bracket including a column having front and rear ends, a cylindrical arm having a proximal end rigidly attached to the column's rear end, and having a spindle arm having a proximal end rigidly attached to the column's front end, the spindle arm being fitted for extension into the spool's bore; a pivot joint interconnecting the " C " bracket and the base, the pivot joint having first and second halves, first half being positioned at the base's rear end, and the second half including the " C " bracket's cylindrical arm; and a concavity positioned within the base for, upon the spindle arm's oppositely lateral extension into the spool's bore and upon downward pivoting of the " C " bracket, receiving and frictionally engaging the spool's circular walls.

18 Claims, 5 Drawing Sheets

(56) References Cited

U.S. PATENT DOCUMENTS

| | | | |
|---|---|---|---|
| 4,780,982 | A | 11/1988 | Black et al. |
| 4,795,107 | A | 1/1989 | Williams |
| 4,958,784 | A | 9/1990 | Totten |
| 5,029,409 | A | 7/1991 | Nouwens |
| 5,544,839 | A | 8/1996 | Burch |
| D376,190 | S | 12/1996 | VanHorn, Jr. et al. |
| 5,725,172 | A | 3/1998 | Koehler et al. |
| 6,224,011 | B1 | 5/2001 | Gavaza, III |
| 6,254,029 | B1 | 7/2001 | Robertson et al. |
| 6,651,921 | B1 | 11/2003 | Travis |
| D587,337 | S | 2/2009 | Loftis |
| 2008/0197224 | A1 | 8/2008 | Touchstone |
| 2008/0315026 | A1 | 12/2008 | Sleeper |
| 2012/0205481 | A1 | 8/2012 | Stout |

FOREIGN PATENT DOCUMENTS

| | | |
|---|---|---|
| GB | 2443245 | 4/2008 |
| WO | WO93/09667 | 5/1993 |
| WO | WO2009/016868 | 5/2009 | ial fish
FISHING LINE DISPENSER

FIELD OF THE INVENTION

This invention relates to fishing and apparatus associated with the fishing arts. More particularly, this invention relates to apparatus adapted for assisting in transfers of bulk spooled fishing line onto fishing reels.

BACKGROUND OF THE INVENTION

Apparatus for assisting a fisherman with the task of transferring fishing line from a bulk spool to a fishing reel are known. Such apparatus are commonly bulky, lacking in space economy, and often are mechanically complex. Such apparatus are also commonly tedious and labor intensive in configuration for use, and in reconfiguration for storage, and such apparatus are typically lacking in materials and costs economies.

The instant inventive fishing line dispenser solves or ameliorates the problems, deficits, and defects of prior art fishing line dispensers discussed above by incorporating within the fishing line dispenser a rigid pivoting "⊏" bracket and base plate combination having multiple specialized features which allow the bracket and plate to work symbiotically with each other.

BRIEF SUMMARY OF THE INVENTION

A first structural component of the instant inventive fishing line dispenser comprises a base having a front end, a rear end, a lateral side, an oppositely lateral side, an upper surface, and a undersurface. In a preferred embodiment, the base is rectangular and is oblongated along its front to rear dimension. Suitably, the base may comprise wood or plastic block material. Alternatively and preferably, the base component may comprise durable injection molded plastic.

A further structural component of instant inventive fishing line dispenser comprises a "⊏" bracket which, similarly with the structure of a common capital letter "⊏", comprises a pair of cantilevering arms having a column portion spanning between and interconnecting the arms' proximal ends. The upper arm (according to the letter view) of the "⊏" preferably comprises a cylindrical and rigidly cantilevered extension whose cross-sectional profile is suitable for service and function as a pin half of a common pin and socket pivot joint. In the preferred embodiment, the socket half of such joint is positioned at a rearward end of the dispenser's base plate. The lower arm of the "⊏" preferably comprises a spool spindling shaft which is fitted for lateral extension through the axial bore of a common bulk fishing line spool.

In a preferred embodiment, the "⊏" bracket is composed of a length of round metal bar stock, preferably stainless steel, and suitably aluminum. The rigid attachments of the proximal ends of the cylindrical arm and the spindle arm to the "⊏" bracket's column preferably comprise 90° bends in such bar. The instant invention's provision of such "⊏" configured metal bar advantageously promotes materials and costs economy while enhancing both mechanical simplicity in line dispensing and facilitating compact storage of the device.

A further structural component of the instant inventive fishing line dispenser comprises a frictional bearing surface which is preferably configured as a floor of a spool receiving concavity. In the preferred embodiment, such concavity extends downwardly into the base plate and opens upwardly, the concavity being positioned at the plate's forward end. In the preferred embodiment, the floor of such concavity is arcuately curved for enhanced function as a frictional slide bearing with respect to rotating circular side walls of the fishing line spool.

In the compact storage use of the instant inventive fishing line dispenser, the fisherman may pivot the "⊏" bracket downwardly toward the base. Upon pivoting of the "⊏" bracket into close proximity with the base, the dispenser maximizes space economy and may be stored within compact sales packaging or within a fishing equipment storage box.

In active line dispensing use of the instant inventive fishing line dispenser, the fisherman may initially upwardly pivot the "⊏" bracket and may laterally extend a bulk fishing line spool over the "⊏" bracket's spindle arm, such extension causing the spindle arm to oppositely laterally extend through the spool's bore. Thereafter, the fisherman may pivot both the spool and the "⊏" bracket downward until the spool's circular end walls enter the base's concavity and frictionally contact the concavity's curved floor.

Thereafter, the fisherman may attach an end of the spooled line to a fishing reel and may progressively transfer the fishing line from the spool to the fishing reel. During such transfer, sliding friction existing between the circular peripheral edges of the spool's disc shaped end walls and the floor of the concavity prevents any undesirable slackening of the fishing line between the reel and the spool.

Accordingly, objects of the instant invention include the provision of a fishing line dispenser which incorporates structures, as described above, and which arranges those structures in relation to each other in the manners described above, for the performance of the advantageous functions described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
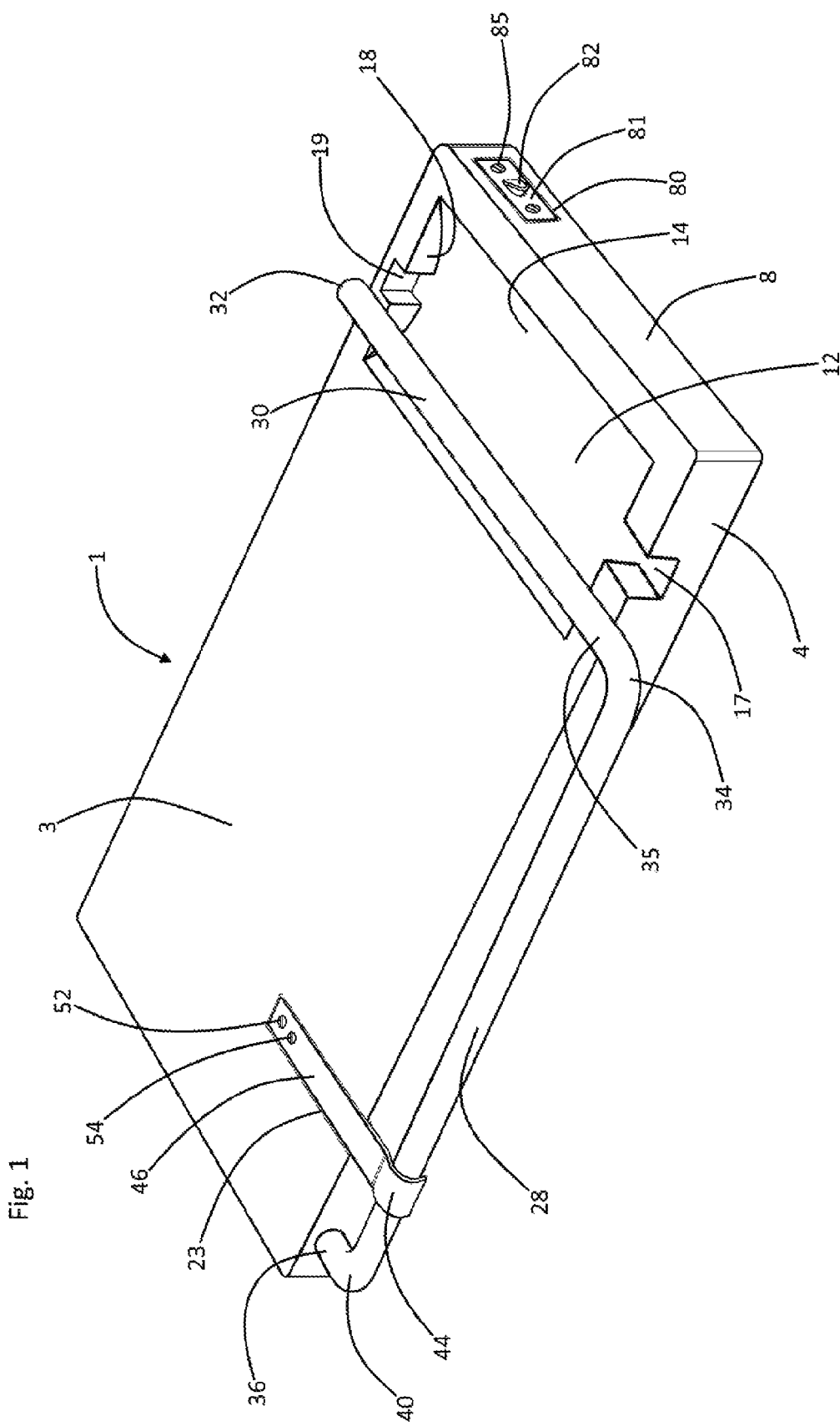
FIG. 1 is a perspective view of a preferred embodiment of the instant inventive fishing line dispenser.

Referring now to the drawings and in particular simultaneously to Drawing FIGS. 1-3, and 5, a preferred embodiment of the instant inventive fishing line dispenser is referred to generally by Reference Arrow 1. The dispenser 1 preferably comprises a rectangular base component which is referred to generally by Reference Arrow 2. The base 2 has an upper surface 3 and has a lower surface which is preferably fabricated via an injection molding process to present a matrix of downwardly opening concavities 5 and stiffening ridges 7. The provision of such concavities advantageously promotes the invention's materials and cost economies objectives, and a bulk reduction objective. As an alternative to the injection molded base 2 represented in the drawings, the invention's base may suitably, though less desirably, comprise a solid wooden, plastic, or laminate composite slab. The base 2 further has a front end 8, a rear end 10, a lateral side 4, and an oppositely lateral side 6, the rectangle of the base preferably being oblongated in the direction of its front to rear dimension.

Preferred specialized features of the base include a bearing surface formed at the floor 14 of an upwardly opening concavity 12. While the bearing surface may suitably comprise a plain flat upper surface of the base, the concavity 12 including a curved floor 14 is preferred, such concavity advantageously forming a lateral spool slide stopping wall 16 and an oppositely lateral spool slide stopping wall 18. In the preferred embodiment, such lateral and oppositely lateral slide stopping walls 16 and 18 are respectively slotted by lateral and oppositely lateral spindle arm clearance slots 17 and 19. Such walls 16 and 18 and slots 17 and 19 perform functions including defining the concavity 12, stopping axial motions of a spool 60, and compactly receiving a spindle arm 30, such functions being further discussed below.

A further functional feature of the base component 2 comprises a socket 20 which preferably extends oppositely laterally into and opens laterally at the rearward end of the base's side wall 4. Such specially positioned socket 20 comprises a pivot joint half, the function of which is further discussed below.

A further functional feature of the base 2 comprises a spring arm recess 23 having screw eyes 22 and 24. The functions of such components 22,23,24, include compact storage and spool down force enhancement, and are further discussed below.

A further specialized functional feature of the base 2 comprises a line shear plate recess 80 which is preferably positioned at the forward end 8 of the base 2, the function of such recess 80 being further discussed below.

Referring simultaneously to FIGS. 1-4, a further structural component of the instant inventive fishing line dispenser comprises a "⊏" bracket which, similarly with the common structure and configuration of a capital letter "⊏", has a column section and has a pair of rightwardly extending arms extending from the column's upper and lower ends. A preferred configuration of the instant invention's "⊏" bracket is referred to generally in FIG. 3 by Reference Arrow 26, and the capital letter "⊏" configuration of the bracket 26 is most clearly shown in FIG. 4. The "⊏" bracket has a column portion 28, a cantilevering upper/rearward cylindrical arm 36, and a cantilevering lower/forward spindle arm 30.

The "⊏" bracket's cantilevering cylindrical arm 36 is preferably rigidly attached to the rearward end of the column 28 by means of a substantially 90° bend 40, and the cantilevering spindle arm 30 is similarly rigidly attached to the forward end of the column 28 by means of a second substantially 90° bend 34. The distal or oppositely lateral end 38 of the "⊏" bracket's cylindrical arm 36 is preferably fitted for receipt within and for an oppositely lateral extension into the socket 20. Upon nesting receipt of arm 36 within socket 20 as indicated in FIGS. 1, 2, 4, and 5, the combination of such socket and such arm advantageously comprises first and second halves of a pivot joint.

Similarly with the cylindrical arm 36's capacity for an oppositely lateral extension into socket 20, the "⊏" bracket's spindle arm 30 is preferably fitted for an oppositely lateral extension into and through the bore 70 of the bulk spool 60 of fishing line 72, such spool 60 being of the type commonly purchased in fishing tackle shops. Upon installation of the spool 60 over spindle arm 30 in the manner indicated in FIG. 2, the "⊏" bracket 26 be pivoted downwardly to cause the spool's lateral and oppositely lateral walls 62 and 69 to extend downwardly into the concavity 12. Such downward pivoting and spool extension preferably continues until the peripheral circular edges 64 and 68 of such walls frictionally engage the arcuately curved floor 14 of the concavity 12.

Figure 2:
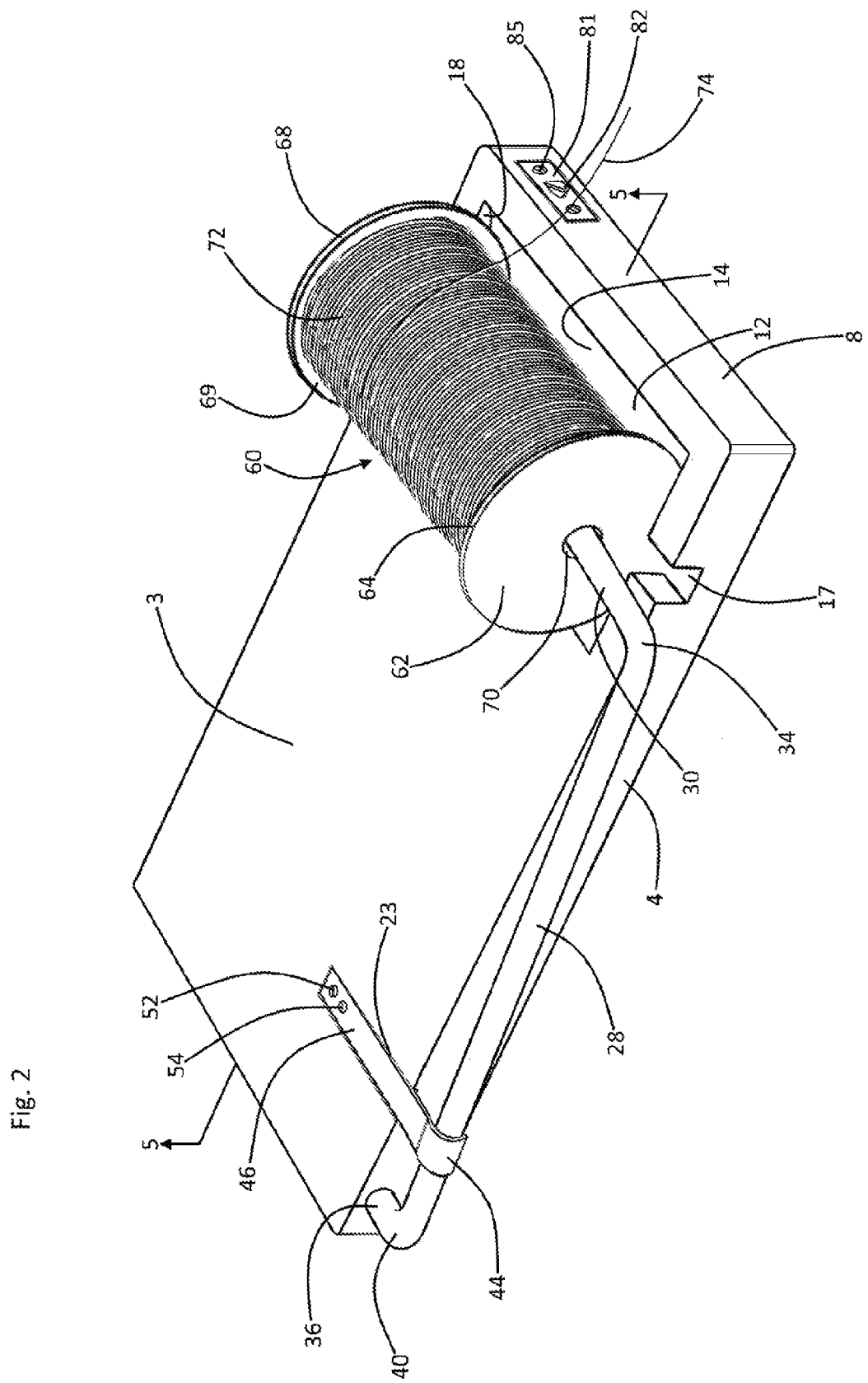
FIG. 2 redepicts the structure of FIG. 1, the view of FIG. 2 additionally showing a spool of fishing line.

In active use of the instant inventive fishing line dispenser 1, a fisherman may initially assemble the spool 60 and the "⊏" bracket 26 as indicated in FIG. 2. Thereafter, the fisherman may attach an end 74 of the spooled fishing line 72 to a fishing reel (not depicted within views), and may operate such reel to progressively unwind the fishing line 74 from the spool 60. Such unwinding progressively rotates the spool clockwise according to the view of FIG. 2, and during such spool rotation the circular edges 64 and 68 slidably move against the floor 14 of the concavity 12. Forwardly directed frictional forces applied by the floor 14 to the edges 64 and 68 damp any kinetic spinning motion of the spool 60 during such reel winding, advantageously preventing slackening of the fishing line.

Figure 3:
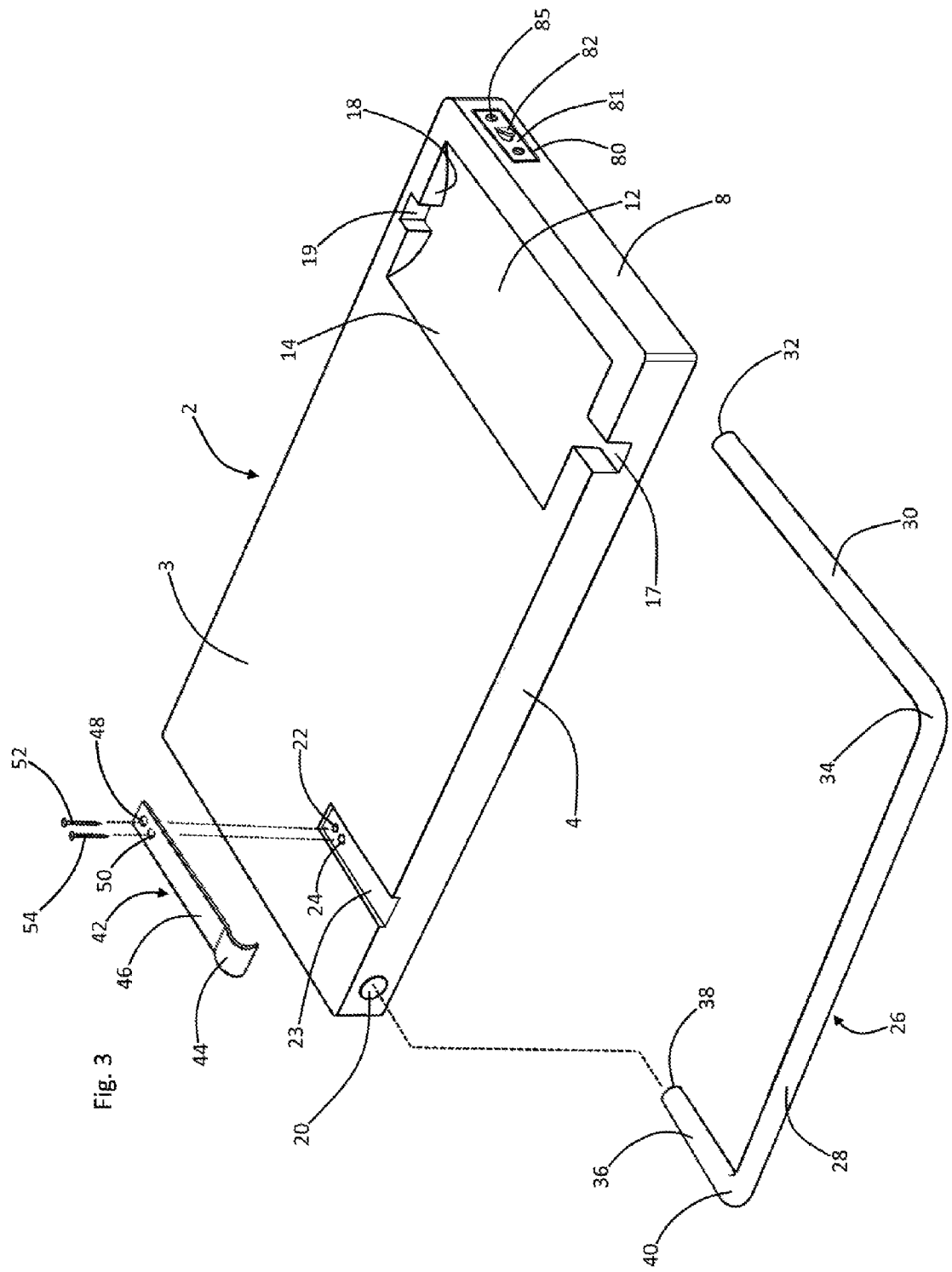
FIG. 3 redepicts the structure of FIG. 1 in exploded view.
Figure 4:
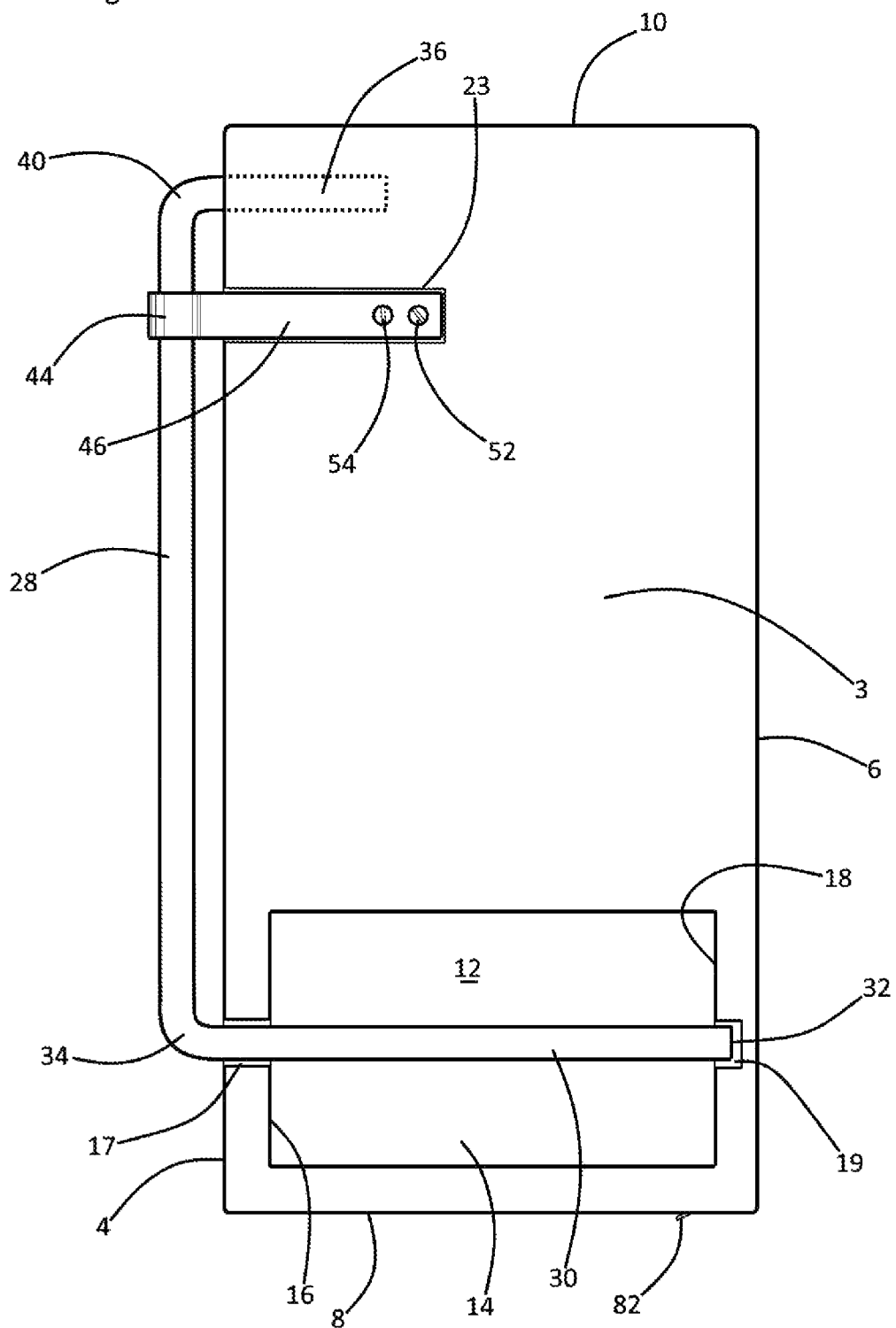
FIG. 4 is an upper plan view of the structure depicted in FIG. 1.

Means for enhancing such slack preventing frictional forces experienced between edges 64 and 68 and floor 14 may be advantageously provided by the instant invention, such means preferably comprising a spring arm and hook combination which, referring to FIG. 3, is referred to generally by Reference Arrow 42. Such combination 42 preferably has a spring steel arm portion 46 which includes a pair of screw eyes 48 and 50 situated at such arm's proximal end. A curved hook 44 is wholly formed with the spring arm 46 at such arm's distal end, such hook 44 preferably being fitted to at least engage the upper surface of the "⊏" bracket's column 28. For purposes of compactness of the device, the spring arm 46 portion of the hook and spring arm combination 42 is preferably fitted for downward receipt into recess 23 within the upper surface 3 of the base 2. Such recess 23 preferably includes screw eyes 22 and 24, and screws 52 and 54 preferably secure the proximal end of arm 46 at eyes 22 and 24. Such proximal end attachment advantageously allows the hooked distal end 44 of the arm 46 to deflect or splay upwardly and to normally bias downwardly against the "⊏" bracket's column 28. The downwardly directed force exerted by the hook and spring arm combination 42 against the "⊏" bracket 26 advantageously drives the spool 60 along with its frictional circular edges 64 and 68 against the curved floor 14 of the concavity 12, such frictional contact enhancing the floor's line slack preventing function.

Figure 5:
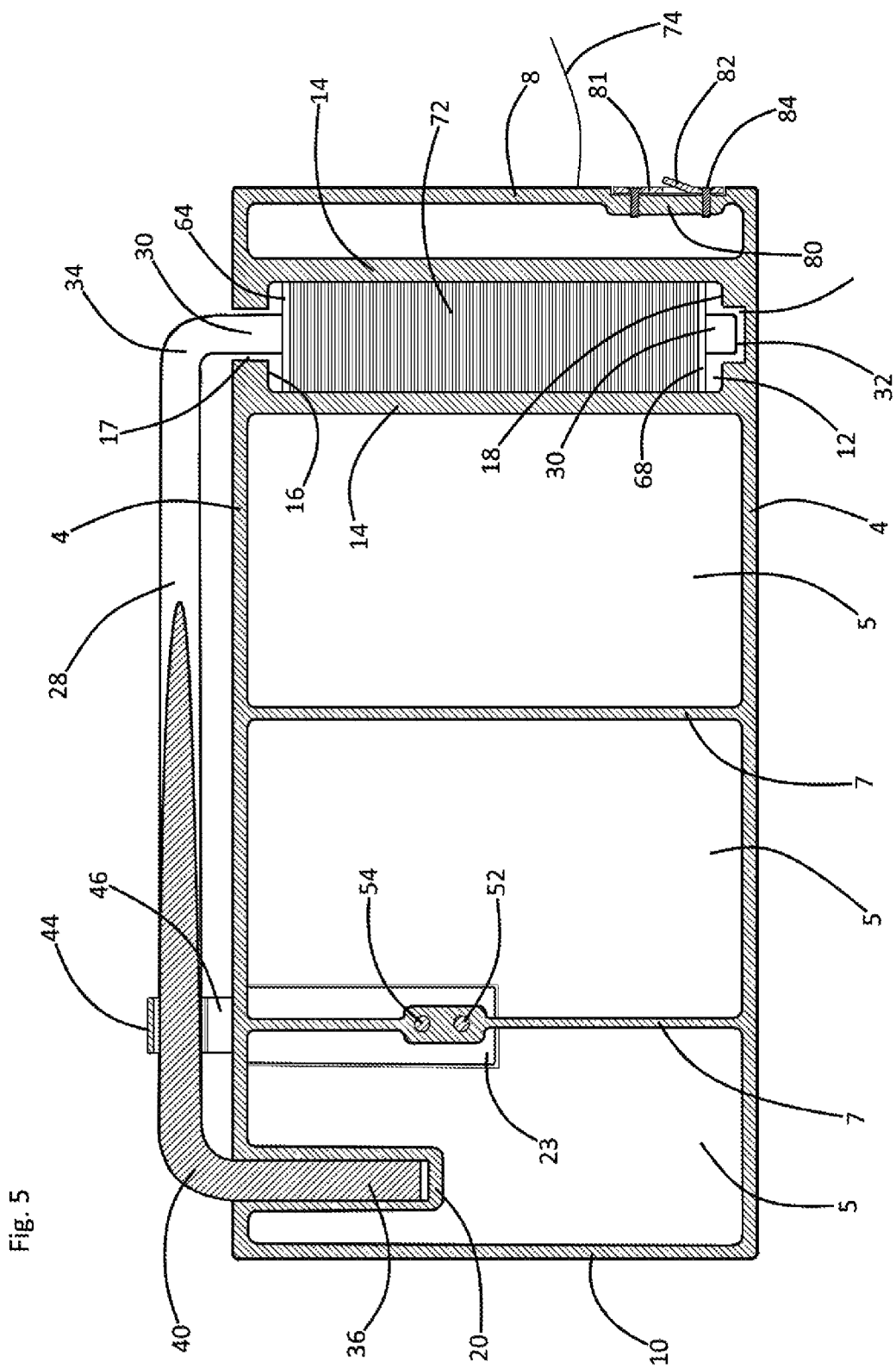
FIG. 5 is a sectional view of the structure of FIG. 2, as indicated in FIG. 2.

As indicated in FIGS. 2 and 5, the distal or tail end of the hook 44 preferably further extends to laterally overlie the lateral aspect of the "⊏" bracket's column 28, such further extension advantageously allowing the hook and arm combination 42 to further function as an extraction stop which resists lateral sliding motion of the cylindrical arm 36 out of socket 20. Accordingly, the hook and spring arm combination 42 within recess 23 advantageously multiply functions for maintenance of the dispenser 1 in its assembled configuration, as depicted in FIG. 1, for enhancing the down force applied to the spool 60 and to the floor 14 of the concavity 12, and facilitating compact storage of the device.

While the lower aspects of the spool walls 62 and 69 reside within concavity 12, as indicated in FIG. 2, the oppositely lateral wall 18 of the concavity 12 advantageously functions as a slide stop which prevents any oppositely lateral sliding motion of the spool 60 along the spindle arm 30. To further prevent a disengagement of the spool 60 from the spindle arm 30, the spindle arm 30 preferably has a distal or oppositely lateral extension which causes its extreme distal end 32 to reside at or slightly extend oppositely laterally from the laterally facing surface of the concavity's oppositely lateral wall 18. Upon compact downwardly pivoting of the spindle arm 30, such oppositely lateral spindle arm extension preferably positions the distal end 32 of the spindle arm 30 within slot 19.

The above described recessing of the hook and spring arm combination 42 within recess 23 assists the instant inventive fishing line dispenser in performance of the compact storage function, such recessing eliminating upward protrusion of the spring arm 46 while the device is not in active use. In order to further such compact storage function, the spool receiving concavity 12 is preferably further opened by the spindle arm receiving slots 17 and 18, such slots being respectively positioned at the lateral and oppositely lateral ends of the concavity 12. In the preferred embodiment, such slots 17 and 18 have a depth equal to the diameter of the spindle arm 30, and such slots are positioned so that the downward pivoting of the "⊏" bracket 26 may continue until the proximal end 35 and distal end 32 of the spindle arm 30 are respectively received within slots 17 and 18. Upon such downward pivoting, the upper aspect of the spindle arm 30 preferably compactly resides at an elevation underlying that of the upper surface 3 of the base plate 2. Accordingly, the preferred recessing of both the hook and spring arm combination 42 and the spindle arm 30 allows the entirety of the fishing line dispenser 1 to be stored within a compact space or sales packaging box having an interior height dimension no greater than that of the base plate 2.

Referring simultaneously to FIGS. 1, 2, and 5, in many circumstances, the fishing line 72 dispensed from the spool 60 to a fishing reel (not depicted within views) will fill such reel while portions of the fishing line remain wound about the spool 60. To accommodate for such circumstances, fishing line shearing means are preferably installed at and upon the base plate 2, such means advantageously cutting the fishing line and separating the spool 60 from such fishing reel. In a preferred embodiment, a fishing line shear plate 81 is mounted within recess 80 at the forward wall 8 of the base plate 2, such plate 81 being mounted by means of mounting screws 85. A "U" slot and catch tab combination 82 punched within such plate 81 may advantageously laterally catch an oppositely lateral passage of the fishing line 72, and may shear the fishing line at the sharply angled vertex between the plate 81 and the tab 82.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope at least commensurate with the appended claims.

The invention hereby claimed is:

1. A fishing line dispenser, the fishing line being wound about a spool, the spool having lateral and oppositely lateral walls having circular edges, the spool further having a bore, the fishing line dispenser comprising:
   (a) a base having a front end, a rear end, a lateral side, and an upper surface;
   (b) a "⊏" bracket comprising a column having front and rear ends, the "⊏" bracket further comprising a cylindrical arm having a proximal end rigidly attached to the column's rear end, the "⊏" bracket further comprising a spindle arm having proximal end and distal ends, the proximal end being rigidly attached to the column's front end, the spindle arm being fitted for an oppositely lateral extension into the spool's bore;
   (c) a pivot joint interconnecting the "⊏" bracket and the base, the pivot joint comprising first and second halves, the pivot joint's first half being positioned at the base's rear end, and the pivot joint's second half comprising the "⊏" bracket's cylindrical arm; and
   (d) a bearing surface positioned upon the base for, upon the spindle arm's oppositely lateral extension into the spool's bore and upon downward pivoting of the "⊏" bracket, frictionally contacting the spool's lateral and oppositely lateral walls.

2. The fishing line dispenser of claim 1 further comprising a concavity positioned for receipt of the spool's walls, the concavity having lateral and oppositely lateral ends and a floor, the floor comprising the bearing surface.

3. The fishing line dispenser of claim 2 wherein the first joint half comprises a socket fitted for a nesting receipt of the "⊏" bracket's cylindrical arm.

4. The fishing line dispenser of claim 3 wherein the "⊏" bracket is composed of metal bar stock, and wherein the rigid attachments of the "⊏" bracket's cylindrical and spindle arms respectively to the column's rear and front ends comprise substantially 90° bends.

5. The fishing line dispenser of claim 4 wherein the first joint half's socket opens laterally at a rearward end of the base's lateral side.

6. The fishing line dispenser of claim 4 further comprising a stop fixedly attached to or formed wholly with the base, the stop being positioned for, upon the concavity's receipt of the spool's lateral and oppositely lateral walls, resisting oppositely lateral movement of the spool.

7. The fishing line dispenser of claim 6 wherein the concavity comprises a laterally facing wall, and wherein the stop comprises said wall.

8. The fishing line dispenser of claim 7 wherein the spindle arm has a distal end positioned at or oppositely laterally from the laterally facing wall.

9. The fishing line dispenser of claim 7 further comprising an extraction stop fixedly attached to the base, the extraction stop being adapted for, upon the socket's nesting receipt of the cylindrical arm, resisting lateral movement of the "⊏" bracket.

10. The fishing line dispenser of claim 9 wherein the extraction stop comprises a hook and spring arm combination.

11. The fishing line dispenser of claim 10 wherein the spring arm has proximal and distal ends, the hook being attached to said distal end and being fitted for engaging the column.

12. The fishing line dispenser of claim 11 wherein the fixed attachment of the extraction stop to the base positions the spring arm rearwardly from the concavity.

13. The fishing line dispenser of claim 12 wherein the hook and spring arm combination is adapted for, upon the extension of the spindle arm into the spool's bore and upon the concavity's receipt of the spool's lateral and oppositely lateral walls, frictionally engaging said walls' circular edges with the concavity's floor.

14. The fishing line dispenser of claim 13 wherein the concavity's floor is arcuately curved.

15. The fishing line dispenser of claim 2 further comprising at least a first clearance slot, said slot being fitted for nestingly receiving the spindle arm and being positioned at the concavity's lateral end.

16. The fishing line dispenser of claim 15 further comprising a second clearance slot fitted for nestingly receiving the spindle arm's distal end, the second clearance slot being positioned at the concavity's oppositely lateral end.

17. The fishing line dispenser of claim 1 further comprising a line shear plate fixedly attached to the base.

18. The fishing line dispenser of claim 17 further comprising a "U" slot and catch tab combination, the "U" slot extending through the line shear plate and the catch tab extending from the line shear plate.

* * * * *